(12) United States Patent
Augustyniak

(10) Patent No.: US 11,345,130 B2
(45) Date of Patent: May 31, 2022

(54) TRANSPARENT COMPOSITE MATERIAL AS CLADDING MATERIAL FOR ARCHITECTURAL FEATURES IN BUILDING CONSTRUCTION

(71) Applicant: SC Innovation, LLC, Houston, TX (US)

(72) Inventor: Martin Augustyniak, Elma, NY (US)

(73) Assignee: SC Innovation, LLC, Houston, TX (US)

( * ) Notice: Subject to any disclaimer, the term of this patent is extended or adjusted under 35 U.S.C. 154(b) by 0 days.

(21) Appl. No.: 16/703,610

(22) Filed: Dec. 4, 2019

(65) Prior Publication Data

US 2020/0101704 A1 Apr. 2, 2020

Related U.S. Application Data

(62) Division of application No. 15/337,971, filed on Oct. 28, 2016.

(Continued)

(51) Int. Cl.
*B32B 27/32* (2006.01)
*B32B 7/12* (2006.01)
(Continued)

(52) U.S. Cl.
CPC .............. *B32B 27/322* (2013.01); *B32B 1/00* (2013.01); *B32B 1/08* (2013.01); *B32B 3/04* (2013.01);
(Continued)

(58) Field of Classification Search
CPC ........... B32B 27/322; B32B 3/04; B32B 1/00; B32B 2250/40; B32B 2307/416; B32B 2419/06; B32B 2607/00; B32B 2307/412; B32B 2307/54; B32B 2367/00; B32B 2419/00; B32B 1/08; B32B 7/12; B32B 15/08; B32B 27/08; B32B 27/281; B32B 27/285; B32B 27/286; B32B 27/302;
(Continued)

(56) References Cited

U.S. PATENT DOCUMENTS 4,228,218 A * 10/1980 Takayanagi ........... C08L 101/00
428/412
5,763,050 A * 6/1998 Hirmer ................. B32B 27/325
428/174

(Continued)

FOREIGN PATENT DOCUMENTS

EP 2749407 A1 7/2014

*Primary Examiner* — Basil S Katcheves
*Assistant Examiner* — Omar F Hijaz
(74) *Attorney, Agent, or Firm* — Norton Rose Fulbright US LLP

(57) ABSTRACT

A composite material may be used as a building material to provide desirable visible aesthetics, such as in a roof or facade. The composite material may include two or more materials, wherein a first material provides desirable qualities for appearance and a second material provides desirable qualities for strength or other characteristics desirable of a building material. Each of the first material and the second material may be transparent, such that the composite material is also transparent. The first material may be Ethylene tetrafluoroethylene (ETFE) and the second material may be Polyethylene terephthalate (PET).

20 Claims, 8 Drawing Sheets

Related U.S. Application Data

(60) Provisional application No. 62/314,716, filed on Mar. 29, 2016, provisional application No. 62/247,564, filed on Oct. 28, 2015.

(51) Int. Cl.

| | | |
|---|---|---|
| *B32B 27/30* | (2006.01) | |
| *B32B 27/28* | (2006.01) | |
| *E04B 1/66* | (2006.01) | |
| *E04D 5/00* | (2006.01) | |
| *B32B 27/36* | (2006.01) | |
| *H02S 20/26* | (2014.01) | |
| *B32B 1/00* | (2006.01) | |
| *E04B 7/18* | (2006.01) | |
| *B32B 15/08* | (2006.01) | |
| *B32B 3/04* | (2006.01) | |
| *B32B 1/08* | (2006.01) | |
| *B32B 27/40* | (2006.01) | |
| *B32B 27/08* | (2006.01) | |
| *E04B 1/61* | (2006.01) | |
| *E04C 2/20* | (2006.01) | |
| *E04C 2/54* | (2006.01) | |
| *E04B 7/10* | (2006.01) | |

(52) U.S. Cl.
CPC ........... *B32B 7/12* (2013.01); *B32B 15/08* (2013.01); *B32B 27/08* (2013.01); *B32B 27/281* (2013.01); *B32B 27/285* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/365* (2013.01); *B32B 27/40* (2013.01); *E04B 1/54* (2013.01); *E04B 1/665* (2013.01); *E04B 7/18* (2013.01); *E04C 2/20* (2013.01); *E04C 2/54* (2013.01); *E04D 5/00* (2013.01); *H02S 20/26* (2014.12); *B32B 2250/03* (2013.01); *B32B 2250/24* (2013.01); *B32B 2250/40* (2013.01); *B32B 2255/10* (2013.01); *B32B 2255/205* (2013.01); *B32B 2255/26* (2013.01); *B32B 2307/3065* (2013.01); *B32B 2307/412* (2013.01); *B32B 2307/416* (2013.01); *B32B 2307/54* (2013.01); *B32B 2307/712* (2013.01); *B32B 2307/714* (2013.01); *B32B 2307/732* (2013.01); *B32B 2327/12* (2013.01); *B32B 2355/00* (2013.01); *B32B 2367/00* (2013.01); *B32B 2419/00* (2013.01); *B32B 2419/06* (2013.01); *B32B 2607/00* (2013.01); *E04B 7/10* (2013.01); *Y02B 10/10* (2013.01)

(58) Field of Classification Search
CPC ... B32B 27/304; B32B 27/306; B32B 27/308; B32B 27/32; B32B 27/36; B32B 27/365; B32B 27/40; B32B 2250/03; B32B 2250/24; B32B 2255/10; B32B 2255/205; B32B 2255/26; B32B 2307/3065; B32B 2307/712; B32B 2307/714; B32B 2307/732; B32B 2327/12; B32B 2355/00; E04D 5/00; E04B 7/18; E04B 7/10; E04B 1/54; E04B 1/665; E04C 2/54; E04C 2/20; Y02B 10/10; H02S 20/26; Y02E 10/50
USPC ... 52/717.04, 376, 52, 782.1, 782.22, 783.1, 52/793.1, 793.11, 796.1, 404.1, 506.01, 52/784.15, 794.1
See application file for complete search history.

(56) References Cited

U.S. PATENT DOCUMENTS

| | | |
|---|---|---|
| 6,335,479 B1 | 1/2002 | Yamada et al. |
| 9,221,990 B2 | 12/2015 | Jing et al. |
| 2006/0234038 A1 | 10/2006 | Kernander et al. |
| 2007/0059499 A1 | 3/2007 | Yuasa et al. |
| 2010/0119760 A1 | 5/2010 | Kirk, II et al. |
| 2011/0114148 A1 | 5/2011 | Temchenko et al. |
| 2011/0247686 A1 | 10/2011 | Honeker et al. |
| 2012/0063952 A1 | 3/2012 | Hong et al. |
| 2012/0118355 A1* | 5/2012 | Rudolfs ............... H02S 20/25 136/251 |
| 2013/0327399 A1 | 12/2013 | Takanashi et al. |
| 2014/0146382 A1* | 5/2014 | Cerny ............. B32B 17/10798 359/288 |
| 2014/0305493 A1* | 10/2014 | Dhir ...................... H02S 40/36 136/251 |
| 2015/0029607 A1 | 1/2015 | Lee et al. |
| 2016/0023433 A1 | 1/2016 | Langone et al. |
| 2017/0190155 A1 | 7/2017 | Gopalakrishnan et al. |

* cited by examiner

TRANSPARENT COMPOSITE MATERIAL AS CLADDING MATERIAL FOR ARCHITECTURAL FEATURES IN BUILDING CONSTRUCTION

CROSS-REFERENCE TO RELATED PATENT APPLICATIONS

This patent application is a divisional of U.S. patent application Ser. No. 15/337,971 entitled "TRANSPARENT COMPOSITE MATERIAL AS CLADDING MATERIAL FOR ARCHITECTURAL FEATURES IN BUILDING CONSTRUCTION" and filed on Oct. 28, 2016, which claims priority to U.S. patent application Ser. No. 62/314,716 to Martin Augustyniak entitled "Transparent Composite Material as Cladding Material for Architectural Features in Building Construction" and filed on Mar. 29, 2016 and to U.S. Provisional Patent Application No. 62/247,564 to Robert Comeau entitled "Composite Films for Architectural Applications" and filed Oct. 28, 2015, each of these referenced applications being incorporated by reference herein.

FIELD OF THE DISCLOSURE

The instant disclosure relates to composite materials. More specifically, portions of this disclosure relate to transparent composite materials with sufficient strength for use as building materials.

BACKGROUND

A roof or façade of a building are visually prominent aspects of a building. These parts of a building are thus areas of great interest by architects in shaping the appearance of the building. Of particular interest are transparent materials for use as a building enclosure. The building enclosure may cover areas of importance that are the basis of the transparent composite cladding. The building enclosure is responsible for structural performance, durability, reliability, security, aesthetics, value, constructability, and maintainability, water and moisture resistances, light control, fire performance, and blast resistance. Transparent materials allow natural light to penetrate an interior of a building, reducing the need for artificial light in the space. Transparent materials also allow colored lighting to be projected throughout the building to enhance the visual effect. One conventional material frequently used as cladding material for a building enclosure is Ethylene tetrafluoroethylene (ETFE).

ETFE is a transparent polymer material with strong weatherability, but has limited tensile strength and is prone to creep. The ETFE is conventionally manufactured as pillows or cushions to improve the structural stability of the material, and the pillows or cushions are installed on buildings. ETFE cushions add significant cost to the cladding system as they double and triple the amount of ETFE material needed within the coverage area, require expensive extruded aluminum clamping systems, and require expensive air handling and ductwork systems to maintain inflation. An example of ETFE cushions on a building is shown in FIG. 1A. FIGURE 1A is a perspective view of a building constructed with ETFE cushions according to the prior art. Architects may be interested in the visual capabilities of ETFE, but are constrained by the requirement to package the ETFE in the cushion shape.

ETFE can also be used in a single layer application, but the system is limited to a span of less than 1 meter and must incorporate a grid of steel or cables to distribute loads imposed on the ETFE. Single layer ETFE applications add significant cost to construction in the form of substructure support in the form of steel or cables and the additional manufacturing and labor required to install the steel or cable load carrying system and link the system to the ETFE cladding. FIG. 1B is an illustration of a building constructed with single-layer ETFE 112 supported by a cable grid 114. The cable grid 114 is both expensive to construct and a distracting architectural feature.

SUMMARY

A composite material may provide better functionality for use as a building enclosure or in other aspects of a building. The composite material may include two or more materials, in which a first material provides desirable qualities of durability, reliability, aesthetic, constructability and maintainability and a second material provides desirable qualities for strength, durability, reliability, aesthetic, constructability and maintainability or other characteristics desirable of a building material. In some embodiments, the composite material may include a first material for exterior protection and a second material for strength. The second material may be part of a support carrier on which the first material is attached. Each of the first material and the second material may be transparent, such that the composite material is also transparent. In one embodiment, the material for exterior protection may be ETFE and the material for strength may be PET. Using a support carrier for the ETFE may allow use a thin ETFE layer for protection from external forces, e.g., improved weatherability, compared to the thicker single ETFE layer for weatherability and strength of conventional structures described above. The thinner ETFE layer can still adequately protect other materials within the composite, such as the support carrier. The thinner ETFE layer may also allow for increased clarity of the composite, compared to a thicker ETFE layer of the prior art. Furthermore, the support carrier may provide sufficient strength to allow construction of much larger panels, and thus allow an architect to design outside of the limitations of the conventional ETFE pillows or conventional single-layer ETFE with 1 meter×1 meter cable grid required of the prior art.

The composite material may be organized as a support carrier including one or more strength layers and/or functionality layers surrounded on one or more sides by a protection layer that provides the desired durability, reliability, aesthetic, constructability and maintainability aspects. The support carrier enables the use of the protection layer as an exposed feature in a building without requiring the protection layer to meet the strength and engineering requirements of the structure. Thus, the protection layer's desirable qualities may be obtained for the building. When such a protection layer has undesirable qualities, such as low strength, the support carrier can supplement the protection layer regarding those undesirable qualities. That is, the composite material may include different layers for different functions, such as solar control solar harnessing, digital imaging, and/or lighting. An outside layer facing the environment and that is visible to individuals may be selected for architectural aspects. A support carrier for that outside layer may be selected based on strength requirements by an engineer for the building. Certain layers may be transparent for aesthetic effect. In some embodiments, all layers may be transparent to enhance the aesthetic effect. In some embodiments, the support carrier may be a single adhesive layer affixing a protection layer to another protection layer to provide strength, and the single adhesive layer may provide other functionality such as IR reflectance. In other embodiments, the support carrier may be a polymer layer, and attached to one or more fluoropolymer protection layers by an adhesive or other sealing mechanism. For example, the protection layer may be bonded to the support carrier.

Some embodiments of composite films made from layering polymeric materials may provide the designer with materials that provide high strength (e.g., tensile strength), transparency (e.g., VLT %), high durability (e.g., weatherability), and/or high cost performance (e.g., lower cost materials and construction than industry standard conventional materials). In one embodiment, one or more layers of the composite films may include one or more fluoropolymers, such as ETFE, ECTFE, PVF, PVDF, PTFE, PCTFE, PFA, and/or FEP. Further, in some embodiments of the composite films, additional features can be provided through the composite film that could not be implemented in conventional materials, such as solar control, light spectrum manipulation, tinting, shading, solar harnessing, digital imaging, and/or lighting. In embodiments using PET as the strength layer, the PET may be treated to prevent UV and hydrolysis degradation during its service life. Further, the PET may be configured to crystalize when it is exposed to flame to reduce or eliminate dripping, such as to pass the UL94, NFPA 701, ASCM E108, and/or other standards. For example, the PET or other transparent polymer material may be configured to crystalize when exposed to flame to prevent drip, such as by treating the polymer material during manufacturing.

According to one embodiment, an apparatus may include a first substantially transparent material; a second substantially transparent material of a different material than the first substantially transparent material; and/or a first adhesive that attaches the first substantially transparent material to the second substantially transparent material.

According to another embodiment, a composite material for building construction may include a first material configured to allow at least some visible light transmission and configured to face towards an exterior environment around the building construction; a second material configured to allow at least some visible light transmission and configured to provide strength to the composite material to allow use of the composite material in the building construction; and/or a first adhesive attaching the first material to the second material.

According to another embodiment, a method may include attaching a first substantially transparent material to a second substantially transparent material different from the first substantially transparent material to form a substantially transparent composite material for building structures. The step of attaching may include depositing a first adhesive on the first substantially transparent material and/or coupling the second substantially transparent material to the first adhesive.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims.

Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1A:
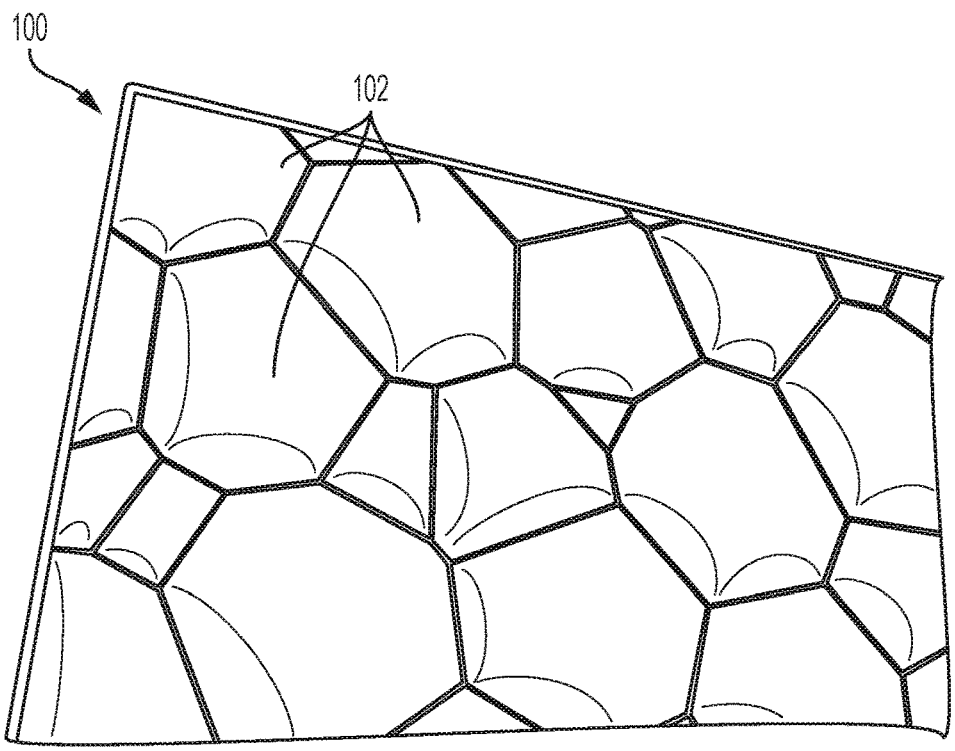
FIG. 1A is a perspective view of a building constructed with ETFE cushions according to the prior art.
Figure 1B:
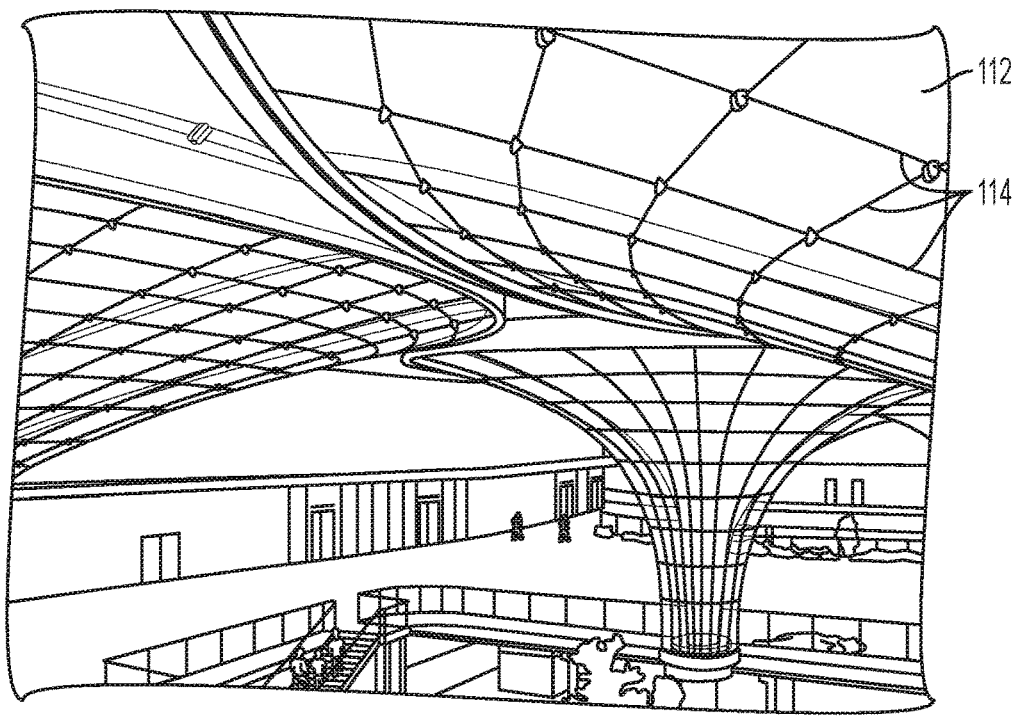
FIG. 1B is an illustration of a building constructed with single-layer ETFE supported by a cable grid.
Figure 2A:
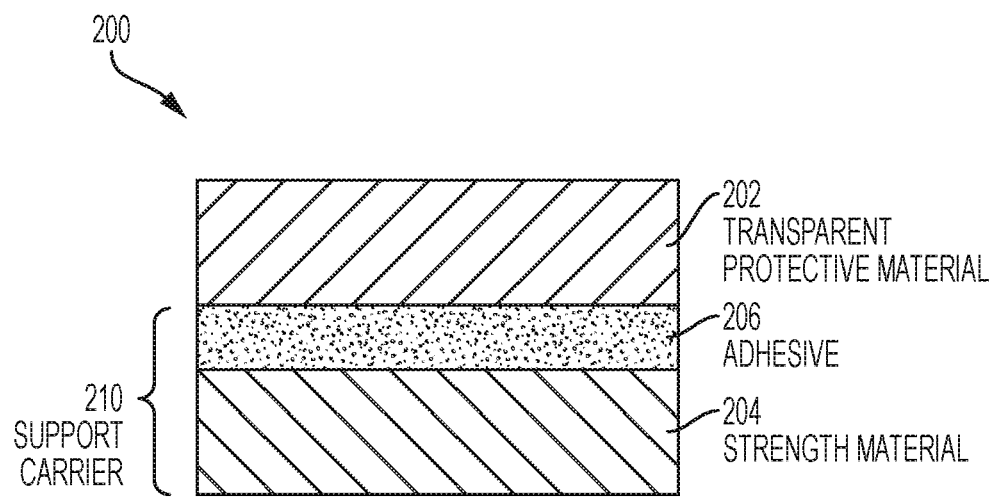
FIG. 2A is a cross-sectional view of a transparent composite material for building construction according to one embodiment of the disclosure.

FIG. 2A is a cross-sectional view of a transparent composite material for building construction according to one embodiment of the disclosure. A composite material 200 may include a combination of two or more materials. In some embodiments, the two or more materials are each substantially transparent, at least to visible light. The composite material 200 may include a first material 202 and a support carrier 210 comprising a second material 204. The second material 204 may be attached to or affixed to the first material 202 by an adhesive 206. The first material 202 may face towards an exterior environment around the building construction. The first material 202 may be selected to provide protection to the support carrier 210, such as from external forces that may affect the support carrier 210. For example, the first material 202 may be selected for its ability to withstand weather, such as rain, hail, snow, ice, etc., and thus protect the support carrier 210 that may not be as durable when exposed to the environment as the first material 202. Other examples of materials for the first material 204 include PVDF or other fluoropolymers. In one embodiment, co-extruding particles and materials may be included within material 202 or 204.

Figure 2B:
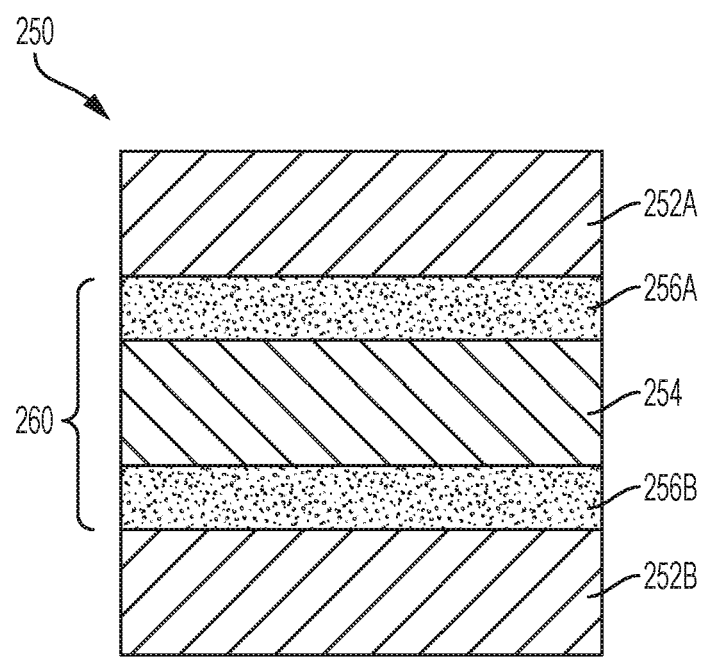
FIG. 2B is a cross-sectional view of a transparent composite material for building construction according to another embodiment of the disclosure.

In some embodiments, such as shown in FIG. 2A, the second material 204 is sealed on one side by the first material 202. In other embodiments, the second material 204 may be sealed on both sides by protective materials, such as shown in the embodiment of FIG. 2B. FIG. 2B is a cross-sectional view of a transparent composite material for building construction according to another embodiment of the disclosure. A composite material 250 may include a first material 252A attached to a support carrier 260 having a second material 254 and adhesive 256A. The first material 252A may face towards an exterior environment and provide protection for the material 254 from the exterior environment. Adhesive 256A may attach the support carrier 260 to the first material 252A. A third material 252B may be attached to the second material 254 by adhesive 256B. The materials 252A and 252B may be the same materials, or in some embodiments the materials 252A and 252B may be different materials. For example, the materials 252A and 252B may both be ETFE. Likewise, the adhesives 256A and 256B may be similar or dissimilar adhesives selected, for example, to match the materials 252A and 252B and/or the target application for composite material 250.

The thicknesses of the materials 252A, 252B, and 254 and adhesives 256A and 256B may be selected, in part, based on an intended application of the composite material 250. For example, a thickness of the second material 254 may determine, in part, a strength of the composite material 250. Because second material 254 is the strength material, increasing the thickness of the second material 254 may increase a weight loading capability of the composite film 250. As another example, a thickness of the first material 252A and 252B may be selected, in part, based on the expected exterior environment around the second material 254. For example, in harsh climates or rainy climates, a thickness of the first material 252A may be increased to withstand additional wear on the composite material 250. In one embodiment, a thickness of materials 252A and 252B may each be approximately 10-125 microns, or more particularly approximately 25 microns, a thickness of adhesives 256A and 256B may add up to approximately 25 microns. In some embodiments, a thickness of the second material 254 may be approximately 10-1000 microns, or 25-250 microns, or more particularly 125 microns. In some embodiments, the composite material is formed into a large transparent composite architectural panel by heat sealing manufactured composite materials together to form a building envelope and configured for installation on a building. Such building envelope composite panels may be several hundred feet long, and have an unsupported width or length between approximately 3 and 30 feet.

In some embodiments, the second material 254 may be a PET or other transparent polymer that is chemistry treated to prevent UV degradation. In some embodiments, the PET may be modified from stock formulations. For example, PET is a useful high strength material, however PET materials drip in fire. Thus, when the composite material 250 is used for building structures (e.g., a roof or other enclosure), the PET may be modified to prevent drip when exposed to flame. One example of such a modification is to modify the PET such that the PET crystalizes at high temperature to prevent dripping of the PET during a fire.

In some embodiments, the second material 254 may comprise multiple layers. For example, the second material 254 may include two layers of like or different materials attached together by an adhesive. Some materials have limits to the available thickness. Multiple layers of such materials may be adhered together to form a stronger second material 254, when desired for certain applications.

Figure 2C:
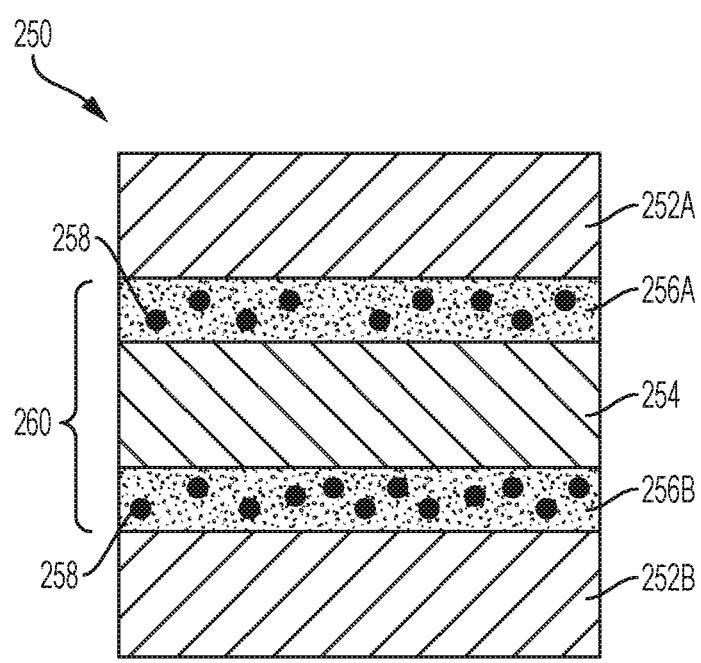
FIG. 2C is a cross-sectional view of a transparent composite material for building construction according to a further embodiment of the disclosure.

In addition to providing strength, the support carrier may include materials or designs to provide additional features to the composite material. For example, additional features may be added to a composite material by inserting particles and/or nanoparticles with certain characteristics to the composite material. In some embodiments, the particles and nanoparticles may be incorporated into one or more adhesive layers of the composite material, such as shown in FIG. 2C. FIG. 2C is a cross-sectional view of a transparent composite material for building construction according to a further embodiment of the disclosure. The composite material 250 of FIG. 2C is similar to the composite material 250 of FIG. 2B, but includes particles 258 embedded in the adhesives 256A and 256B. Although particles 258 are shown in both adhesives 256A and 256B, the particles 258 may be present in only one of the adhesives 256A and 256B. Further, the nanoparticles may be present when there is only one adhesive, such as adhesive 206 in FIG. 2A.

The particles 258 may have a chemistry selected to obtain desired functionality. For example, the particles 258 may be selected to obtain tinting or shading, such as by partially blocking visible light, either the entire spectrum of visible light (e.g., shading) or a portion of the spectrum of visible light (e.g., tinting). Other example uses of particles 258 may include other spectral manipulations, such as to reflect infrared (IR) radiation or to absorb infrared (IR) radiation. Although nanoparticles have been described as embedded in an adhesive layer, the nanoparticles may alternatively or additionally be embedded in other portions of the support carrier.

Other functionality may be integrated into layers of the support carrier or as additional layers of the support carrier. For example, micro light emitting diodes (micro LEDs) and associated circuitry and wiring may be incorporated in the support carrier. The LEDs may be configured to provide lighting and/or to produce digital imaging capability within a composite material or in an array of panels. For example, many panels of composite material may be connected to form a roof or building façade and incorporate digital imaging technology into the support carrier of the material used to display images like a television or scoreboard. In some embodiments, a liquid crystal layer, similar to that of liquid crystal displays (LCDs), or an organic LED (OLED) layer, may be included in the support carrier and configured to couple to electronics that control the liquid crystal or OLEDs to generate a digital image. As another example, solar harnessing materials may be built into the support carrier. Solar concentrating materials may include additives to layers of the support carrier or a specific layer of the support carrier that redirects light impinging on the support carrier towards a collection point. A photovoltaic cell, or other device for converting light to electricity, may be located at that collection point to convert light received across the entire support carrier to electricity. As a further example, a photovoltaic layer may be integrated with the support carrier and configured to generate electricity from light impinging on the apparatus. As still a further example, an electrochromatic layer may be integrated with the support carrier and configured to provide a variable tint in the apparatus. Electronics, such as wires and control circuitry, may be attached to the electrochromatic layer to apply a variable tint or color to the support carrier. When a composite material with the support carrier is used as a roof, the electrochromatic layer may be controlled to darken during sunny days and lighten during cloudy days. As a further example, a heat reflectance layer may be integrated with the support carrier and configured to reflect a heat to reduce solar heat gain during the day and be switched off at night to allow heat to radiate out of the space. Some circuitry is described as supporting functionality for certain features in the support carrier layers, and similar circuitry may be configured for other feature layers included in the support carrier.

Figure 4:
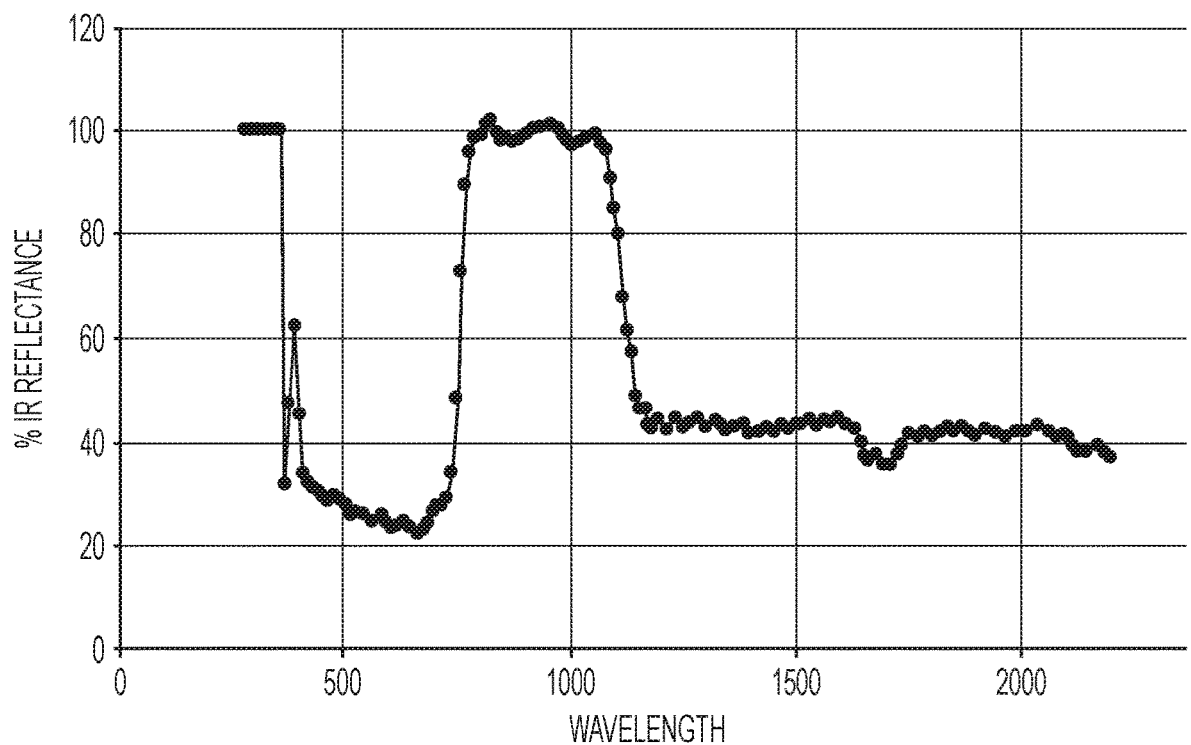
FIG. 4 is a graph illustrating light reflectance for a support carrier with an IR reflectance layer according to one embodiment of the disclosure.

As yet another example, a layer may be added to the support carrier and configured to reflect infrared (IR) radiation. An example spectral characteristic of a support layer with such an IR reflection layer is shown in FIG. 4. FIG. 4 is a graph of reflectance versus light wavelength, which shows nearly 100% reflectance of light in the IR spectrum from approximately 760 nm to 1100 nm while allowing nearly 80% transmission of light in the visible spectrum from approximately 400 nm to 750 nm. In some embodiments, such an IR reflectance layer may be a thin metal layer, and the support carrier may be modified through sputter or evaporation techniques to adhere one or more metals to the support carrier to reflect infrared (IR) radiation and maintain visible light transmission.

Figure 3:
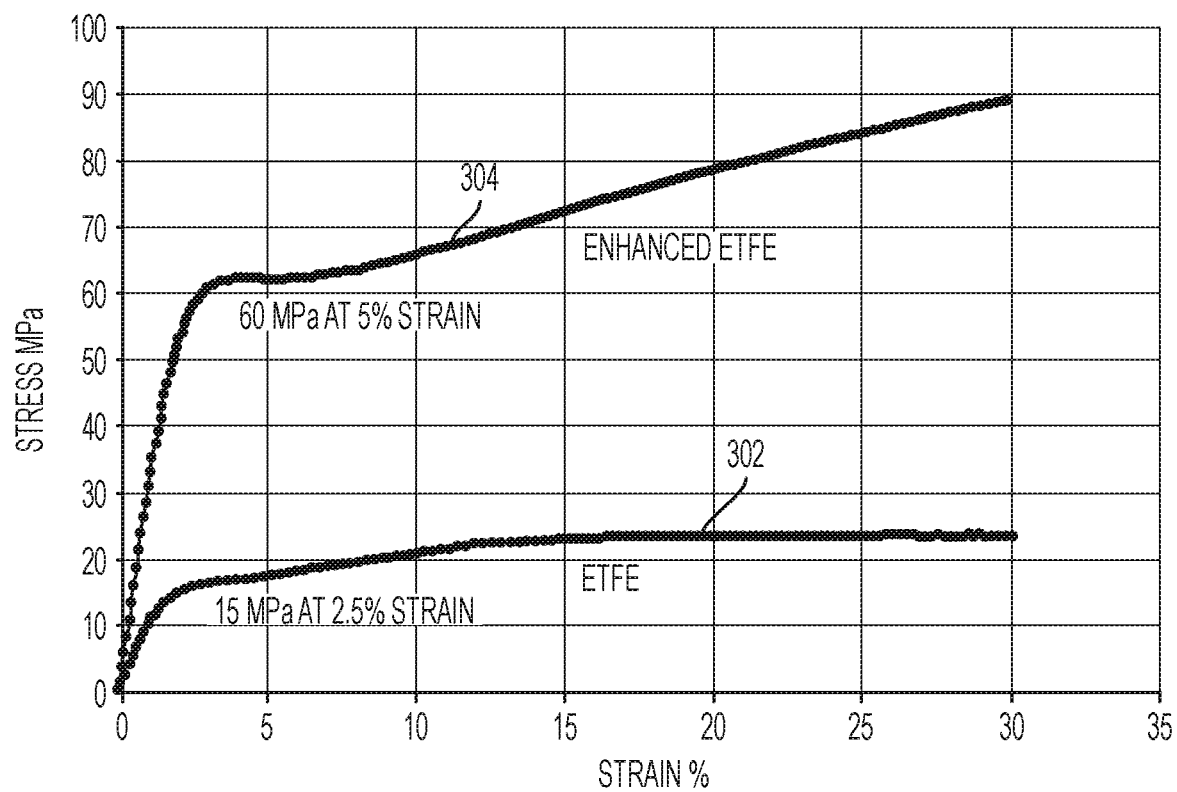
FIG. 3 is a graph illustrating stress-strain of a composite material formed according to embodiments of this disclosure compared to a single-layer ETFE of the prior art.

Embodiments of the composite materials described above have been tested and the results of the tests are shown in FIG. 3. FIG. 3 is a graph illustrating stress-strain of a composite material formed according to embodiments of this disclosure compared to a single-layer ETFE of the prior art. Line 302 illustrates a stress-strain curve for a conventional single-layer ETFE material. Line 304 illustrates a stress-strain curve for an enhanced ETFE material by incorporating a support carrier with the ETFE as a protective layer. As shown in FIG. 3, embodiments of the composite material using a support carrier may have stress-strain results significantly better than conventional single-layer ETFE materials. Thus, embodiments of the composite material may be useful in applications requiring high strength materials, such as enclosures or other architectural aspects for buildings.

The higher strength of the support carrier-based composite material shown by the stress-strain graph allows for more architectural freedom when designing and constructing a building. For example, the grid of steel or cables to carry load imposed on the ETFE material as described in the background may be eliminated or fewer cables may be required to support the cladding and resist snow and wind loads. Elimination of some or all of these cables provides freedom to the architect or engineer in the design of the building and provides improved aesthetic appearances. In the case of a cushion configuration, higher strength material allows the designer to increase the size (e.g., width) of a cushion and increase the internal pressure within the cushion to resist extreme snow and wind loads.

A composite film may be formed from the support carrier and one or more protection layers. The composite film may be formed into a flexible membrane and have a lighter weight than equivalent glass materials, which are also conventionally used as a transparent cladding material. A decrease in weight may allow the composite films to be supported by less building substructure than glass. The increase in strength of the composite film from the support carrier may allow additional flexibility in the sizing of panels of the composite material. An increase in size of the panels may allow new architectural designs not possible with conventional glass or ETFE films.

Figure 5A:
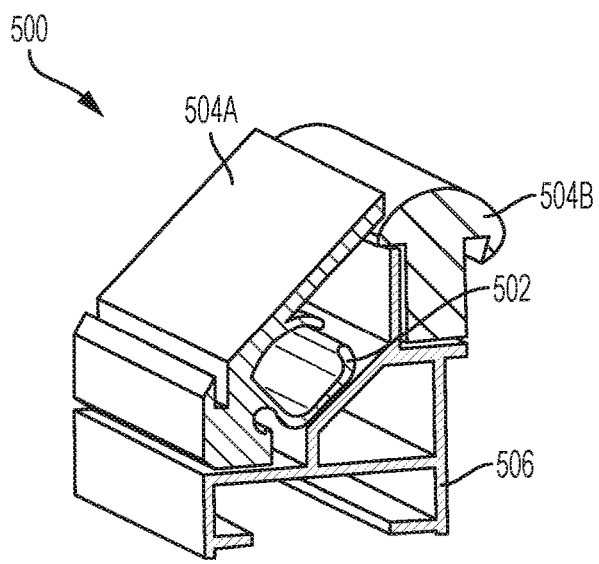
FIG. 5A is a perspective view of an extrusion for connecting a composite material with a support carrier to a perimeter structural support according to one embodiment of the disclosure.

Some techniques for building construction with composite films having a support carrier are described with reference to FIGS. 5-9. In some embodiments, the composite films may be attached to a rod-like structure, such as an EPDM chord, a nylon rod, or a rope. The rod-like structure may be used to connect composite panels to a building substructure. FIG. 5A is a perspective view of an extrusion for connecting a composite material with a support carrier to a perimeter structural support according to some embodiments of the disclosure. An extrusion 500 may include a holder 502 for holding a rod-like structure attached to the composite film. Supports 504A, 504B press against the composite film attached to the rod that fits in the holder 502. Attachment mechanism 506 attaches the extrusion 500 to a building substructure. For example, the extrusion 500 may hold composite panels on a top or side of a building to serve as a transparent roof. The extrusion 500 may be used at perimeters of an architectural area, such as a perimeter of a roof, to support installation of the composite material panels.

Figure 5B:
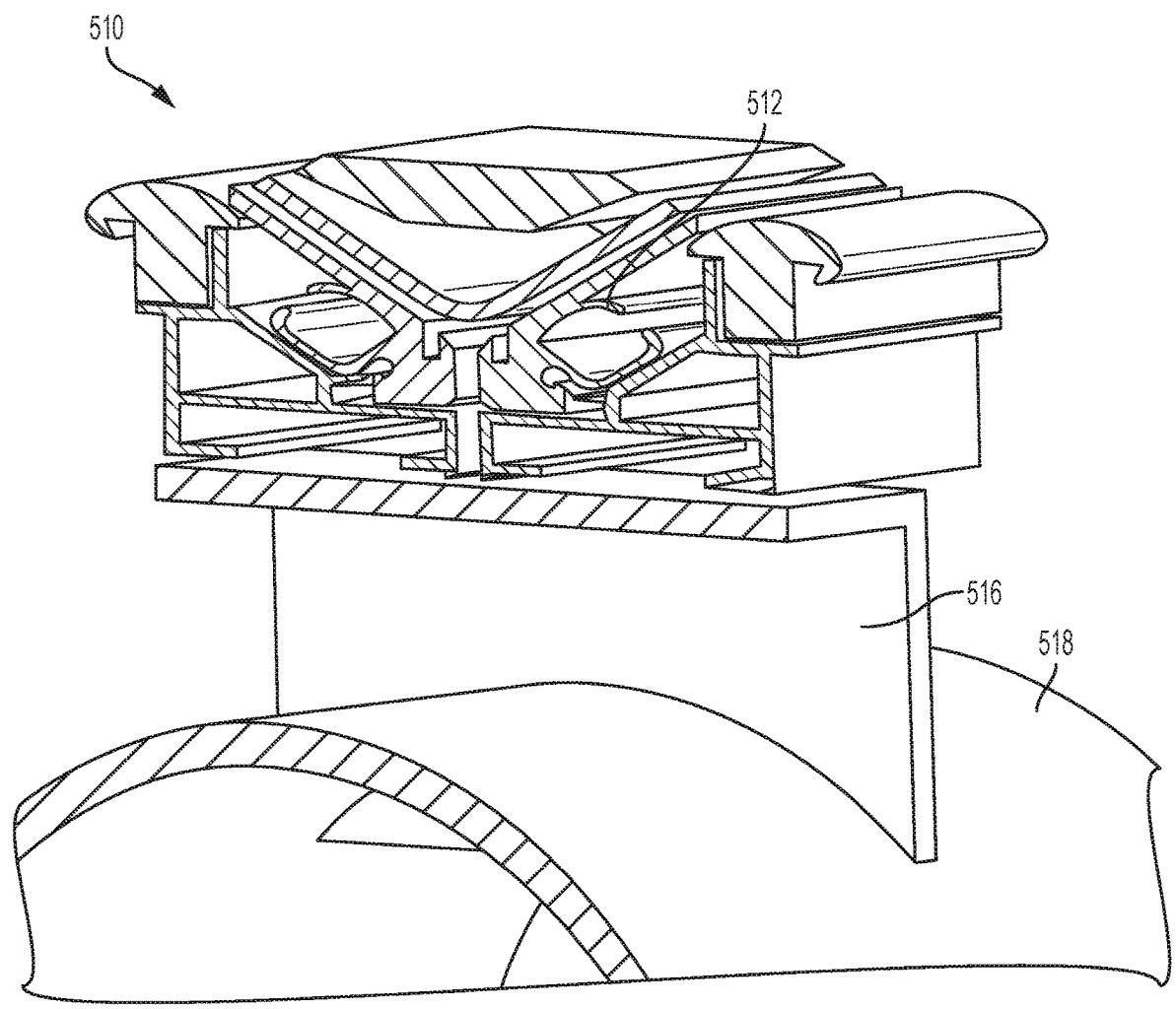
FIG. 5B is a perspective view of an extrusion for connecting a composite material with a support carrier to an intermediate structural support according to one embodiment of the disclosure.

An extrusion may alternatively be used to connect composite material to an intermediate structural support as shown in FIG. 5B. FIG. 5B is a perspective view of an extrusion for connecting a composite material with a support carrier to an intermediate structural support according to some embodiments of the disclosure. A holder 512 of extrusion 510 may receive a rod-like structure attached to composite film. The extrusion 510 may connect the composite materials to upstands 516 and/or substructure 518. In some embodiments, a birdwire may be attached to the extrusion 510 to assist in preventing wildlife damage to the composite material panels. The extrusion 510 may be used in the middle of an architectural area, such as portions of the roof away from a perimeter, to support installation of the composite material panels on a left and right side of the extrusion 510.

Figure 6:
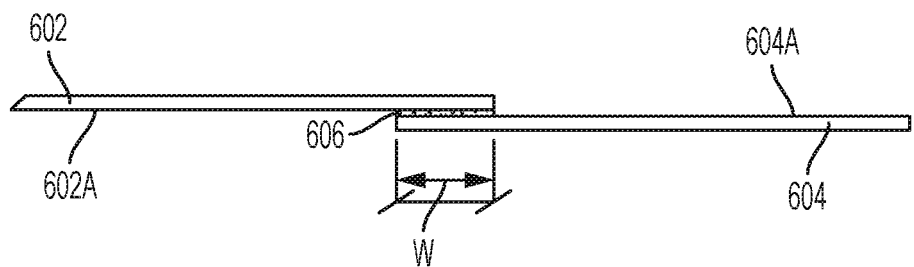
FIG. 6 is a cross-sectional view of a manufactures lap joint for joining panels of composite material with a support carrier according to some embodiments of the disclosure.

In some embodiments, panels of composite material may be directly connected as shown in FIG. 6. FIG. 6 is a cross-sectional view of an attachment of panels of composite material with a support carrier according to some embodiments of the disclosure. A first panel 602 and a second panel 604 may each be a composite material panel with a support carrier as described in embodiments above. A bottom surface 602A of the first panel 602 and a top surface 604A of the second panel 604 may be attached in overlapping region 606 to form a lap seal. For example, a heat seal may be formed, an adhesive may be applied, and or a tape may be applied to attach the first panel 602 to the second panel 604. In some embodiments, the overlap width w may be between 0.375 inches and 2 inches.

Figure 7:
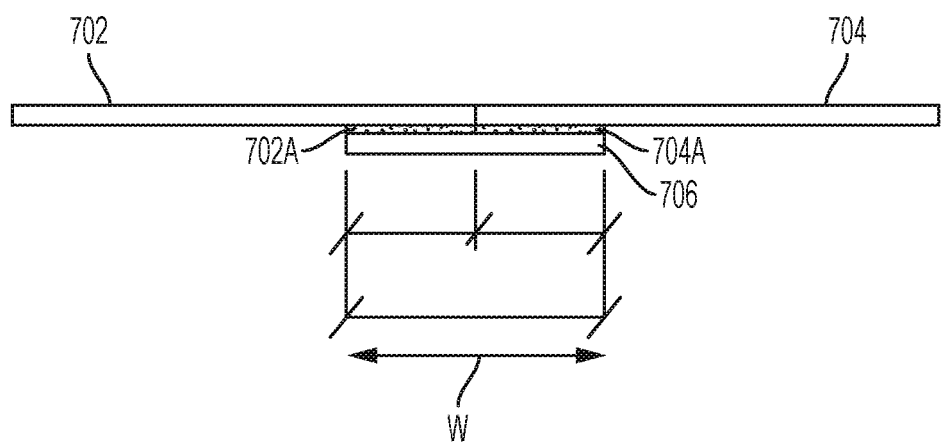
FIG. 7 is a cross-sectional view of a manufactured butt joint for joining panels of composite material with a support carrier according to some embodiments of the disclosure.

In some embodiments, panels of composite material may be indirectly connected through a butt joint to a secondary material as shown in FIG. 7. FIG. 7 is a cross-sectional view of a manufactured butt joint for attaching panels of composite material with a support carrier according to some embodiments of the disclosure. A first panel 702 and a second panel 704 may be attached through secondary material 706. The first panel 702 may be attached to the secondary material 706 in overlapping region 702A; the second panel 704 may be attached to the secondary material 706 in overlapping region 704A. In some embodiments, a width of the overlapping regions 702A and 704A may be approximately 0.375 to 2 inches, although the two widths of regions 702A, 704A do not need to be identical. In some embodiments, a total overlapping width, or the width of the secondary material 706, may be between 0.75 and 4 inches. The widths of the various overlaps and sizes of the panels may be selected to obtain desired architectural characteristics and to meet necessary strength requirements for support of the building.

Figure 8:
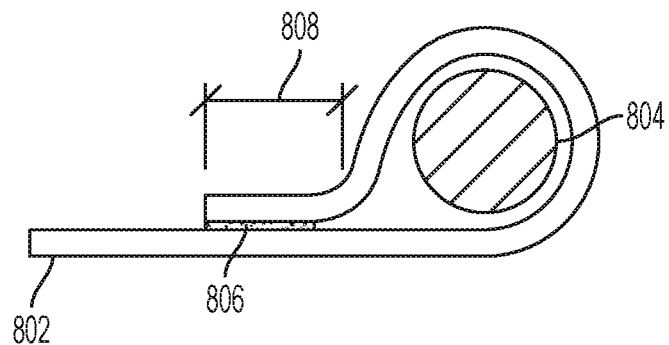
FIG. 8 is a cross-sectional view showing a perimeter edge of a panel of composite material with a support carrier according to some embodiments of the disclosure.
Figure 9:
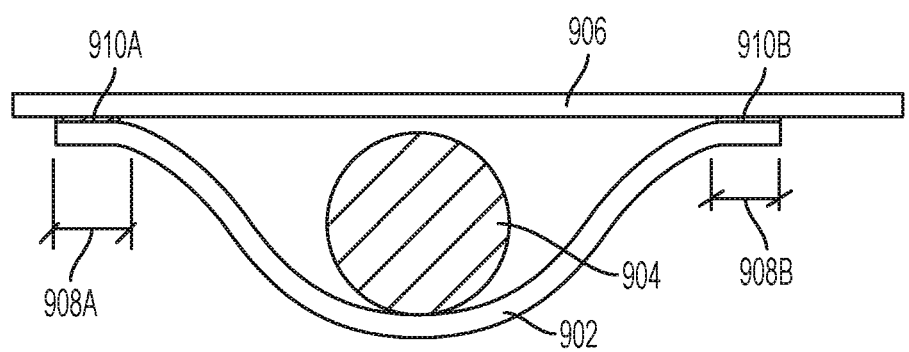
FIG. 9 is a cross-sectional view showing a structural cable connection to a panel of composite material with a support carrier according to some embodiments of the disclosure.

Panels of the composite films may be attached to rod-like structures for attachment to extrusions as shown in FIG. 8 and FIG. 9. FIG. 8 is a cross-sectional view showing an edge of a panel of composite material with a support carrier according to some embodiments of the disclosure. The perimeter detail shown in FIG. 8 may be received by an aluminum extrusion such as shown in FIG. 5A and FIG. 5B. The extrusions may be bolted to a structural frame like that in a glass mullion. A composite film 802 may be rolled at an edge around a rod-like structure 804, such as an EPDM chord, a nylon rod, or a rope. The rod-like structure 804 may provide rigidity to a formed panel from the composite material 802 and/or provide a means for attaching the panel to a building substructure or intermediate structure through extrusions. A seal 806 may be made between the composite material 802 and a curled edge of that same material sheet. An overlapping region 808, or seal width, may be approximately 0.375 inches to 2 inches, although the amount of overlap may be determined specifically for each application of the panels. In FIG. 8, a first portion of the composite material 802 is wrapped around the rod-like structure 804 and sealed 806 to a second portion of the composite material 802.

FIG. 9 is a cross-sectional view showing a structural cable connection to a panel of composite material with a support carrier according to some embodiments of the disclosure. A film 902 may be attached to film 906 at seals 910A and 910B to attach the film 902 and 906 to a rod-like structure 904, such as a cable. The seals 910A and 910B may be, for example, heat seals, adhesive seals, or tape seals. An overlapping width 908A and 908B, or seal width, may be approximately 0.375 inches to 2 inches, although the amount of overlap may be determined specifically for each application of the panels. Either or both of the materials 902 and 906 may be a composite material with a support carrier and one or more of the functionalities described in embodiments above. In FIG. 9, the composite panel 906 is attached to the rod-like structure by a material sheet 902 wrapped around the rod-like structure 902 and sealed 910A, 910B to the composite material 906 on opposite sides of the rod-like structure 902.

Although architectural applications for the composite material are described, the composite material may be used for other applications. For example, the composite materials may be used to build flexible electronic devices, outdoor weather-resistance electronic devices, flexible toys with integrated electronic functionality, among other applications. The composite material may be used as a replacement technology for any device conventionally constructed between, for example, rigid glass panels.

Although the present disclosure and certain representative advantages have been described in detail, it should be understood that various changes, substitutions and alterations can be made herein without departing from the spirit and scope of the disclosure as defined by the appended claims. For example, although many single layer embodiments of the composite material with support carrier are provided, the composite material with support carrier may also be formed into cushions for installation in architectural applications. As another example, where a "layer" is referred to, the "layer" may include one or more materials in a layer and may include one or more layers within the "layer." Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus for constructing a building, comprising:
   a composite material comprising:
      a support carrier comprising one or more layers configured to provide strength to the apparatus, in which the support carrier comprises polyethylene terephthalate (PET);
      a first protection layer on a first side of the support carrier configured to provide protection to the support carrier from weather, in which the first protection layer comprises a substantially transparent layer, and in which the first protection layer comprises a fluoropolymer; and
      a second protection layer on a second side of the support carrier,
      in which the composite material has a tensile strength of at least 60 megapascals at 5% strain; and
   a mechanical structure attached to the composite material, wherein the mechanical structure is configured to attach the composite material to at least one of a building substructure or building intermediate structure of the building,
   in which the composite material comprises a panel configured to provide strength for support of the building as part of an enclosure to form a building envelope around the building substructure or building intermediate structure.

2. The apparatus of claim 1, in which a first portion of the composite material is wrapped around the mechanical structure and sealed to a second portion of the composite material.

3. The apparatus of claim 1, in which the composite panel is attached to the mechanical structure by a material sheet wrapped around the mechanical structure and sealed to the composite material on opposite sides of the mechanical structure.

4. The apparatus of claim 1, in which the mechanical structure comprises a cable.

5. The apparatus of claim 1, further comprising an extrusion configured to receive the mechanical structure with attached composite material and to attach to a building substructure.

6. The apparatus of claim 5, in which the extrusion is configured to attach to a perimeter structural support.

7. The apparatus of claim 5, in which the extrusion is configured to attach to an intermediate structure support of the building.

8. The apparatus of claim 1, further comprising an extrusion configured to receive the panel and configured to attach to a structural frame of the building.

9. The apparatus of claim 1, in which the panel comprises a seal made between the composite material and a curled edge of the composite material.

10. The apparatus of claim 9, in which a first portion of the panel is wrapped around the mechanical structure, and in which the seal is made between a curled edge of the panel and a second portion of the panel such that the mechanical structure is enclosed by the panel.

11. The apparatus of claim 1, further comprising a film, in which the panel is attached to the film at two points such that the mechanical structure is enclosed by the panel and the film.

12. The apparatus of claim 11, in which the film comprises a composite material comprising a PET support carrier and an ETFE protection layer on at least one side of the PET support carrier.

13. The apparatus of claim 1, wherein the composite material comprises an architectural aspect of the building.

14. The apparatus of claim 1, in which the first protection layer has a thickness of between 10 and 125 microns, and in which the support carrier comprises a polymer layer with a thickness between 25 and 250 microns.

15. The apparatus of claim 1, in which the support carrier is configured to provide one or more functionalities for the apparatus.

16. The apparatus of claim 1, in which the support carrier comprises particles and is configured to reflect infrared (IR) radiation and maintain visible light transmission.

17. The apparatus of claim 1, in which the fluoropolymer comprises ethylene chlorotrifluoroethylene (ECTFE).

18. The apparatus of claim 1, in which the fluoropolymer comprises ethylene tetrafluoroethylene (ETFE).

19. The apparatus of claim 1, in which the panel comprises an unsupported width or length between 3 and 30 feet.

20. The apparatus of claim 1, in which the mechanical structure comprises a rod-like structure.

* * * * *